(12) United States Patent
Kobayashi

(10) Patent No.: US 10,935,121 B2
(45) Date of Patent: Mar. 2, 2021

(54) STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 16/611,248

(22) PCT Filed: Jun. 16, 2017

(86) PCT No.: PCT/JP2017/022394
§ 371 (c)(1),
(2) Date: Nov. 6, 2019

(87) PCT Pub. No.: WO2018/229987
PCT Pub. Date: Dec. 20, 2018

(65) Prior Publication Data
US 2020/0158220 A1    May 21, 2020

(51) Int. Cl.
*F16H 49/00*  (2006.01)
*F16H 1/32*   (2006.01)
*F16H 57/00*  (2012.01)

(52) U.S. Cl.
CPC .............. *F16H 49/001* (2013.01); *F16H 1/32* (2013.01); *F16H 57/0006* (2013.01)

(58) Field of Classification Search
CPC ............................. F16H 49/001; B25J 9/1025
See application file for complete search history.

(56) References Cited

U.S. PATENT DOCUMENTS

| 3,166,949 A * | 1/1965 | Lapp ..................... F16H 49/001 |
| | | 74/433 |
| 10,641,329 B2 * | 5/2020 | Chen ................... F16C 32/0629 |
| 2020/0049246 A1 * | 2/2020 | Chen ......................... B25J 9/08 |

FOREIGN PATENT DOCUMENTS

| JP | H01158250 A | 6/1989 |
| JP | H02129436 A | 5/1990 |

(Continued)

OTHER PUBLICATIONS

International Search Report (PCT/ISA/210) dated Jun. 16, 2017, by the Japan Patent Office as the International Searching Authority for International Application No. PCT/JP2017/022394.
(Continued)

*Primary Examiner* — Sherry L Estremsky
(74) *Attorney, Agent, or Firm* — Buchanan Ingersoll & Rooney PC

(57) ABSTRACT

A strain wave gearing has a rigid internally toothed gear, a flexible externally toothed gear, and a sliding-contact type wave generator. The wave generator has: a plurality of gear pressing members that flexes the externally toothed gear in the radial direction at positions at equal angular intervals in the circumferential direction to form plurality of meshing portions which mesh with the internally toothed gear; and piezoelectric elements that generate ultrasonic vibration of 20 kHz to 80 kHz in the gear pressing members in the radial direction. Ultrasonic vibration is applied at contact sites where the gear pressing members and the externally toothed gear contact each other. As a result of a squeeze film effect, the apparent friction coefficient of each contact surface at the contact sites can be greatly reduced and rotational torque, of the wave generator can be reduced.

6 Claims, 4 Drawing Sheets

(56) References Cited

FOREIGN PATENT DOCUMENTS

| JP | H02261944 A | 10/1990 |
|----|-------------|---------|
| JP | H08-4845 A | 1/1996 |
| JP | 2012067849 A | 4/2012 |
| JP | 2016217391 A | 12/2016 |

OTHER PUBLICATIONS

Written Opinion (PCT/ISA/237) dated Jun. 16, 2017, by the Japan Patent Office as the International Searching Authority for International Application No. PCT/JP2017/022394.

* cited by examiner

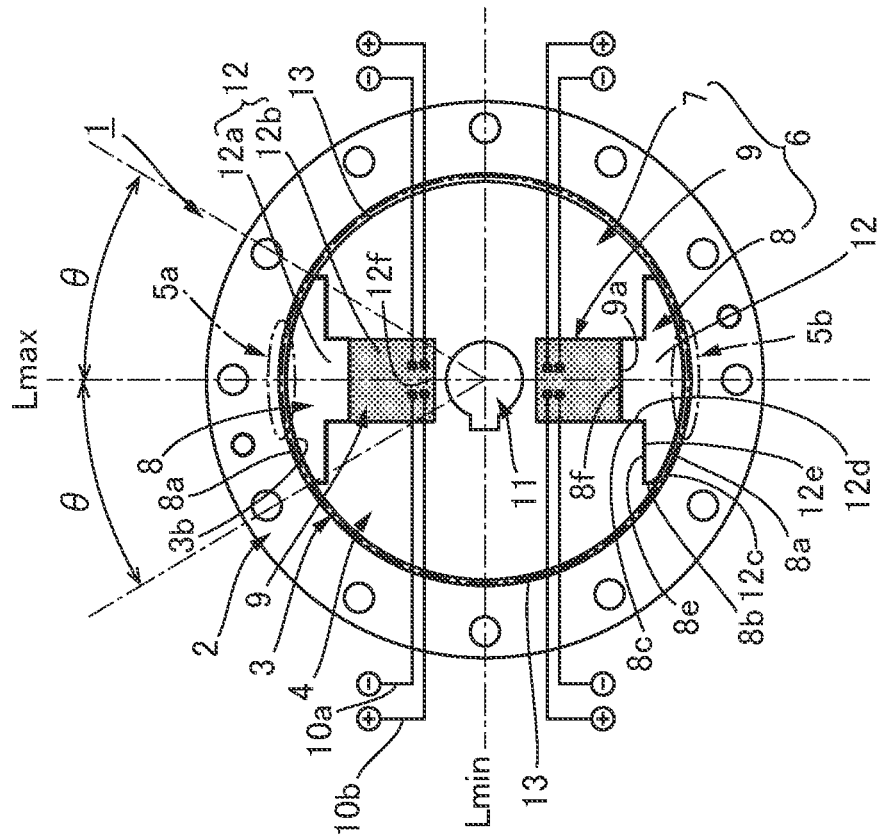
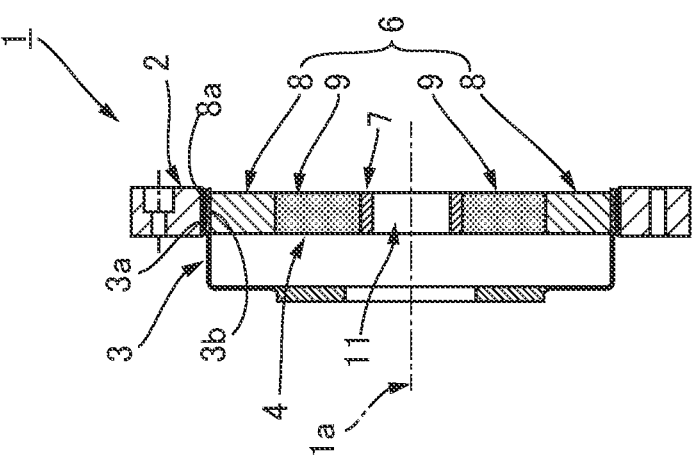

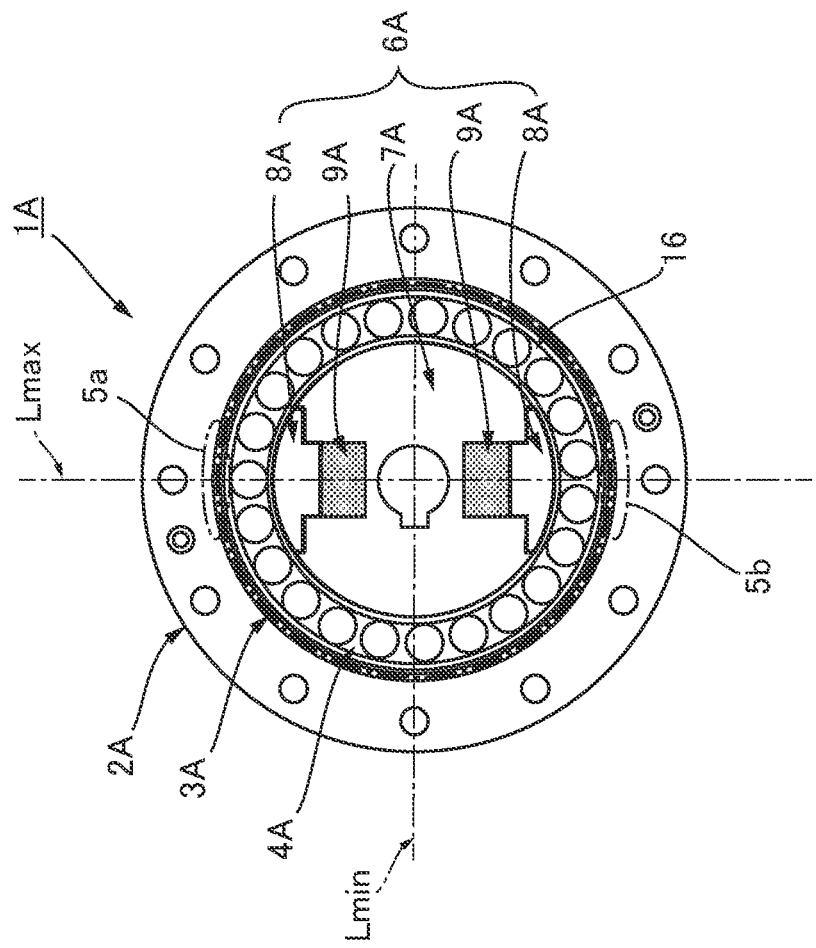
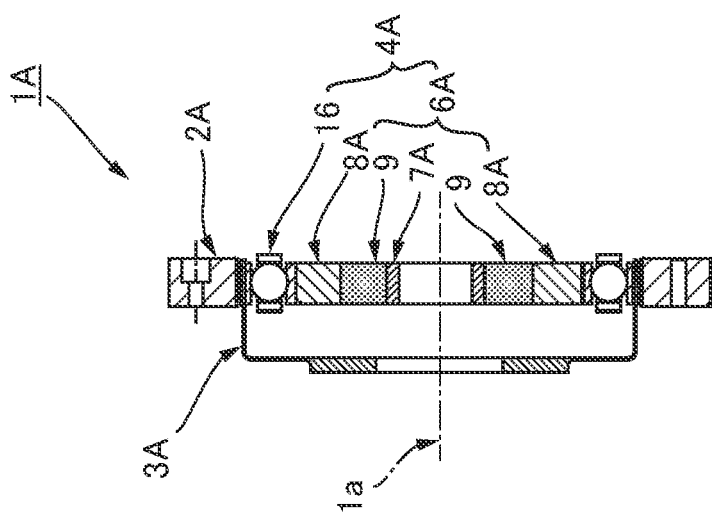

STRAIN WAVE GEARING

TECHNICAL FIELD

The present invention relates to a strain wave gearing, and, in particular, to a strain wave gearing which can reduce rotational torque of a wave generator for generating a wave motion in a flexible gear.

BACKGROUND ART

A strain wave gearing is generally configured so that a wave generator causes to generate a wave motion in a flexible externally toothed gear disposed inside a rigid internally toothed gear and relative rotation is generated between the gears in accordance with the difference in the number of teeth therebetween. A rolling-contact type wave generator is employed as a wave generator. A contact-rolling type wave generator is provided with a rotating body called as a plug or a cam plate having an elliptical contour, the rotating body being mounted inside the externally toothed gear via a rolling bearing. The externally toothed gear is flexed elliptically along the elliptical contour of the rotating body and is meshed with the internally toothed gear. When the rotating body is rotated by a motor or the like, meshing portions of the gears are moved in the circumferential direction. (Wave motion is generated in the externally toothed gear.)

A sliding-contact type wave generator is also proposed for the purpose of obtaining high efficiency, etc. during high-speed rotation. Patent documents 1 and 2 propose strain wave gearings provided with a sliding-contact type wave generator. A sliding-contact type wave generator has a rotating body, for example, a plug that is made to directly come in contact with the inner peripheral surface of an externally toothed gear and is made to slide along the inner peripheral surface thereof, whereby generating wave motion in the externally toothed gear. The sliding-contact type wave generator has an advantage that viscous resistance in rotation is small and an input torque hardly changes even if input rotational speed is changed, but has a disadvantage that a rotational torque to generate the wave motion is large.

In order to reduce the rotational torque in a sliding-contact type wave generator, various methods are adopted for the contact portion between the plug and the externally toothed gear, the methods including improvement of shape, surface modification of the plug, and structure for reducing the radius of the contact portion. However, satisfied effects have not been obtained. In addition, there is also a demand for a rolling-contact type strain wave gearing that rotational torque thereof is further reduced.

PRIOR ART DOCUMENTS

Patent Documents

Patent document 1: JP 2016-217391 A (Cup Type)
Patent document 2: JP H08-4845 A (Flat Type)

SUMMARY OF THE INVENTION

Problems to be Solved by the Invention

An object of the present invention is to provide a strain wave gearing configured to be capable of reducing rotational torque of a wave generator.

Means of Solving the Problems

A strain wave gearing of the present invention has a rigid gear, a flexible gear and a wave generator. The flexible gear is arranged coaxially with the rigid gear and is relatively rotatable with respect to the rigid gear about a center axis line of the rigid gear. The wave generator is arranged coaxially with the flexible gear and is relatively rotatable with respect to the flexible gear about the center axis line. In addition, the wave generator is provided with: a plurality of gear pressing units to flex the flexible gear in a radial direction at positions at equal angular intervals in a circumferential direction so as to form a plurality of meshing portions where the flexible gear meshes with the rigid gear; and an excitation unit to cause the gear pressing units to generate ultrasonic vibration in the radial direction.

The respective gear pressing units of the wave generator press the flexible gear in the radial direction to flex in a state in which the pressing units are applied with ultrasonic vibration. In a case of a sliding-contact type wave generator, for example, ultrasonic vibration of 20 kHz to 80 kHz is applied to the sliding-contact parts between the gear pressing unit and the flexible gear. As a result of a squeeze film effect, the apparent frictional coefficient at the contact surface of each sliding-contact part can be greatly reduced. In addition, the ultrasonic vibration is transmitted to a meshing portion between the flexible gear and the rigid gear, and the apparent frictional coefficient at the meshing tooth surface can be greatly reduced. Accordingly, rotational torque of the wave generator can be reduced.

Here, the wave generator is provided with a rotating body called as a plug or a cam plate having the center axis line as a rotational center. It is possible, as the gear pressing units, to use gear pressing members that are attached, in a radially slidable state, to the rotating body at positions at equal angular intervals in the circumferential direction. As the excitation unit, one or more piezoelectric elements can be used, the piezoelectric elements being attached to the rotating body and being able to displace in one axial direction. The piezoelectric elements are linked to the gear pressing members in a state in which the direction of the displacement thereof coincides with the radial direction.

An example of the strain wave gearing is provided with a rigid internally toothed gear, a flexible externally toothed gear, and a wave generator to flex the externally toothed gear into an elliptical shape and mesh with the internally toothed gear at two locations on both ends of the major axis of the elliptical shape. In this case, the wave generator has a rigid plug as the rotating body, the plug having an elliptical outer peripheral surface and being mounted in the externally toothed gear. The plug can be constituted by: a plug body member forming a main portion of the plug excluding end portions located on both sides of the elliptical shape in the major-axis direction; two gear pressing members that respectively form the end portions on the both sides in the major-axis direction; and one or a plurality of piezoelectric elements. Each of the gear pressing members is attached to the plug body member in a slidable state in the major-axis direction. The piezoelectric elements are attached to the plug body member at positions between the gear pressing members so that the direction of the displacement thereof is in line with the major-axis direction.

In this case, the gear pressing members may be assembled to the plug body member so as to form a state in which the reaction force from the elliptically flexed externally toothed gear is applied to the piezoelectric members as a preliminary load. This makes it possible to form a structure to avoid the piezoelectric elements from being applied with external force in the form of tensile force.

The elliptical rigid plug is provided on the both ends in the major-axis direction with the gear pressing members, a circumferential length of the outer peripheral surface of which can be such that it extends across an angle of 30 degrees to 40 degrees left and right from the major axis, preferably 35 degrees. In the consideration of the radial load distribution of the strain wave gearing during load is being applied, a large radial load is applied to the area within an angular range of approximately 35 degrees left and right from the major axis. The ultrasonic vibration in the major-axis direction can be applied to the area where the radial load is large, whereby the rotational torque of the wave generator can be effectively reduced. In addition, at the side of the plug body member that supports the gear pressing members in a slidable manner, it is possible to provide sufficient guide parts to guide the gear pressing members in the major-axis direction in a reliable manner.

Next, the present invention can also be applied to a strain wave gearing provided with a wave generator that is in rolling-contact with a flexible gear. For example, a wave generator, which flexes a flexible externally toothed gear into an elliptical shape to mesh partially with a rigid internally toothed gear, is provided with a rotating body (which is a plug or a cam plate) and a rolling bearing mounted between an inner peripheral surface of the externally toothed gear and an elliptical outer peripheral surface of the rotating body. In this case, in the respective portions along the major-axis direction of the strain wave gearing, component parts are in contact with each other in both operations load being applied and no-load being applied, and therefore ultrasonic vibration in the major-axis direction is transmitted to the respective portions (including a raceway part of a rolling bearing of the wave generator, an outer race of the rolling bearing and an inner peripheral surface of the internally toothed gear, and tooth surfaces). Thus, even in a strain wave gearing provided with a rolling-contact type wave generator, in which wave motion is generated by making balls or rollers to roll along the elliptical outer peripheral surface of the rotating body, it is possible to reduce rotational torque of the wave generator.

BRIEF DESCRIPTION OF THE DRAWINGS

FIG. 1(a) is a schematic longitudinal cross-sectional view of a strain wave gearing which has a sliding-contact type wave generator provided with two piezoelectric elements, and FIG. 1(b) is a schematic end view thereof;

FIG. 2(a) is a schematic longitudinal cross-sectional view of a strain wave gearing which has a rolling-contact type wave generator provided with two piezoelectric elements, and FIG. 2(b) is a schematic end view thereof;

MODE FOR CARRYING OUT THE INVENTION

Figure 3A:
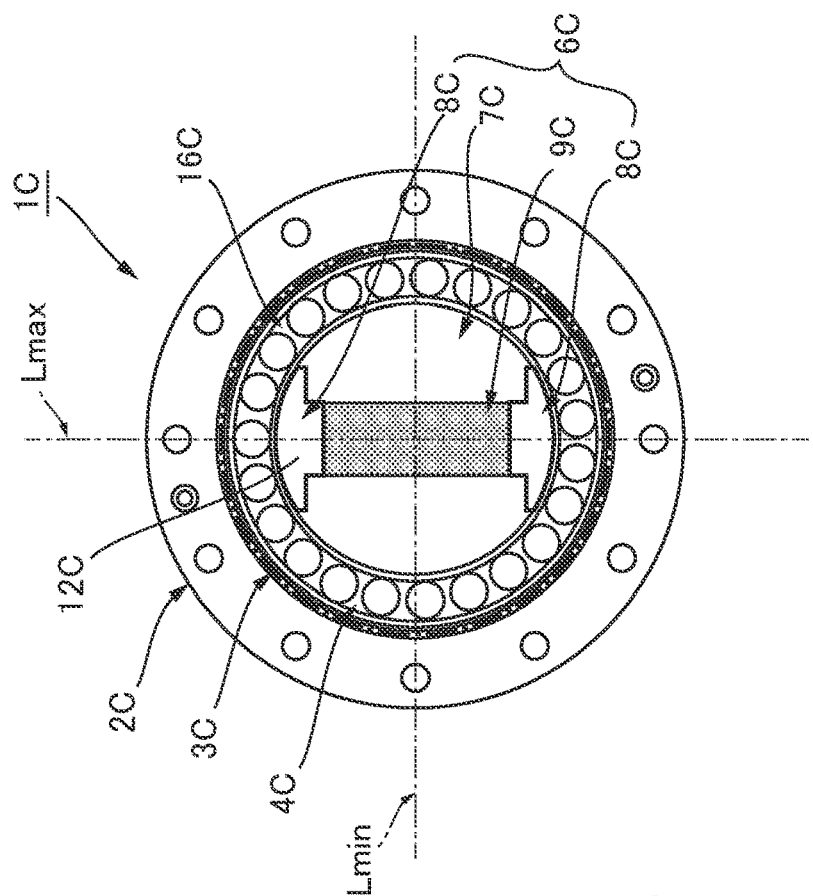
FIG. 3A is a schematic end view of a strain wave gearing which has a sliding-contact type wave generator provided with a single piezoelectric element.

Embodiments of a strain wave gearing according to the present invention will be described with reference to the drawings. The following embodiments relate to a cup-type strain wave gearing. The present invention can also be applied to a silk-hat type strain wave gearing and a flat-type strain wave gearing in a similar manner.

FIG. 1(a) is a schematic longitudinal cross-sectional view of a strain wave gearing according to an embodiment of the present invention, and FIG. 1(b) is a schematic end view thereof. A strain wave gearing 1 is provided with an annular rigid internally toothed gear 2 (rigid gear), a cup-shaped flexible externally toothed gear 3 (flexible gear) disposed coaxially inside the internally toothed gear, and a wave generator 4 fitted coaxially into the externally toothed gear. The internally toothed gear 2 and the externally toothed gear 3 are supported by a not-shown support member in a relatively rotatable state about a device center axis line 1a. The externally toothed gear 3 has a cylindrical body and external teeth 3a formed on the cylindrical body, and the wave generator 4 is fitted into the inner peripheral surface 3b of the cylindrical body where the external teeth are formed. The externally toothed gear 3 and the wave generator 4 are also relatively rotatable about the device center axis line 1a.

The wave generator 4 makes the externally toothed gear 3 to flex into a shape along an elliptical shape and mesh with the internally toothed gear 2 at positions on both ends of a major axis L max of the elliptical shape. When the wave generator 4 rotates, two meshing portions 5a and 5b of the externally toothed gear 3 with the internally toothed gear 2 are moved in the circumferential direction of the internally toothed gear 2. This causes relative rotation to occur between the two gears 2 and 3 in accordance with the difference in the number of teeth between the two gears 2 and 3.

The wave generator 4 has a rigid plug 6 (rotating body) provided with an elliptical outer peripheral surface. The plug 6 is constituted by: a plug body member 7 forming a plug main portion excluding plug end portions located on both sides in the direction of the major axis L max; and two gear pressing members 8 forming the plug end portions on the both sides in the direction of the major axis L max. The plug 6 is also provided with two piezoelectric elements 9 (excitation units) to generate ultrasonic vibration along the direction of the major axis L max in the gear pressing members 8. Power supply lines 10a and 10b are extracted from the piezoelectric elements 9. The piezoelectric elements 9 are controlled to drive by a not-shown controller.

The plug body member 7 is of a line-symmetrical shape with respect to the major axis L max and the minor axis L min, respectively, and a shaft hole 11 is formed in the center of the plug body member to fixedly connect a motor shaft or other input shaft. The plug body member 7 is formed with mounting recesses 12 for mounting the piezoelectric elements 9 and the gear pressing members 8 on both sides of the shaft hole 11 in the direction of the major axis L max. The plug body member 7 has outer peripheral surface portions 13 on both sides of the mounting recesses 12, the outer peripheral surface portions defining an elliptical outer peripheral surface. Each of the mounting recesses 12 is formed with a wide-width outer-peripheral-side recess part 12a and a narrow-width center-side recess part 12b.

The piezoelectric elements 9 are respectively mounted in the center-side recess parts 12b. The piezoelectric elements 9 generate one-axis ultrasonic vibration (vibration frequency is from 20 kHz to 80 kHz). The piezoelectric elements are of a laminated type having a shape of a quadrangular prism, a cylinder or a ring. The piezoelectric elements 9 are mounted in the center-side recess parts 12b so that the direction of vibration thereof is in line with the direction of the major axis L max and are supported by the recess bottom surfaces 12f thereof. Each of the gear pressing members 8 is shaped so that it can be fixed into the outer-peripheral-side recess part 12a and a part of the center-side recess part 12b, and the outer peripheral surface 8a of the gear pressing member defines one end portion in the direction of the major axis L max of an elliptical outer peripheral surface of the plug 6.

Each of the gear pressing members 8 has a side surface having a shape that is complemental to a stepped side surface of the mounting recess 12. The gear pressing member 8 has left and right side surface portions 8b and 8c extending in the direction of the major axis L max in the gear pressing member 8, and the side surface portions are in contact with side surface portions 12c and 12d of the left and right stepped side surfaces of the mounting recess part 12. These side surface portions 8b, 8c, 12c and 12d function as a guide part to allow the gear pressing members 8 to displace (slide) along only the direction of the major axis L max.

The left and right stepped side surfaces of the mounting recess 12 have a stepped surface portion 12e facing outward in the radial direction, the stepped surface portion determining the position of the gear pressing member 8 in the major axis direction. In the present embodiment, there is formed a state in which the reaction force that acts on the gear pressing member 8 from the elliptically flexed externally toothed gear 3, is applied to the piezoelectric element 9 as a preliminary load. In a state in which left and right jaw portions 8e of the gear pressing member 8 are in contact with the stepped portion 12e, the outer peripheral surface 8a of the gear pressing member is smoothly connected to the outer peripheral surface 13 of the plug body member 7 and the tip end surface 9a of the piezoelectric element 9 are pressed by the bottom surface 8f of the gear pressing member 8.

The outer peripheral surface 8a of the gear pressing member 8 has a circumferential length that is set to be a length across an angle θ of 35 degrees left and right from the major axis L max. In the consideration of a radial load distribution when the strain wave gearing 1 operates under load being applied, a large radial load is applied to a portion within this angle range. It is therefore possible to apply ultrasonic vibration in the direction of the major axis L max to a portion where a large radial load occurs. In addition, at the side of the plug body member 7 that slidably supports the gear pressing members 8, it is possible to reliably obtain a sufficient guide part to guide the gear pressing members 8 in the major-axis direction.

In the strain wave gearing 1, the externally toothed gear 3 is flexed into an elliptical shape by the gear pressing members 8 located at both ends of the major axis L max in the plug 6 of the wave generator 4, so that the meshing portions 5a and 5b of the externally toothed gear with the internally toothed gear 2 are formed at two locations. When the plug 6 is rotated by a motor or the like, the gear pressing members 8, which are in sliding-contact with the inner peripheral surface 3b of the externally toothed gear 3, is also rotated together with the plug 6 to move the meshing portions 5a and 5b in the circumferential direction. When the meshing portions 5a and 5b rotate once, relative rotation between the both gears 2 and 3 are generated, the amount of which corresponds to the difference in the number of teeth between the two gears 2 and 3. The difference in number of teeth between the internally toothed gear 2 and the externally toothed gear 3 is 2n (n is a positive integer). For example, a reduced-speed rotation can be taken out from the externally toothed gear 3 when the internally toothed gear 2 is fixed so as not to rotate.

During operation of the strain wave gearing 1, the piezoelectric elements 9 are supplied with electric power to generate ultrasonic vibration. The ultrasonic vibration is applied to the gear pressing members 8 which are in contact with the piezoelectric elements 9. As a result of a squeeze film effect, in each contact site between the outer peripheral surface 8a of the gear pressing member 8 and the inner peripheral surface 3b of the externally toothed gear 3, an apparent friction coefficient of each contact surface is greatly reduced. The rotational torque of the wave generator 4 can therefore be reduced. In addition, the piezoelectric elements 9 are of a laminated type, which is effective to improve rigidity of the plug 6 and to reduce the weight thereof.

According to the experiments conducted by the present inventor, it was confirmed that the friction coefficient of the contact surfaces between the gear pressing member 8 and the wave generator 4 can be greatly reduced as shown in the following table. In addition, when the gear pressing member 8 is vibrated ultrasonically, specifically vibrated at vibration frequency of 20 kHz or more, it was confirmed that the vibration and noise of the strain wave gearing 1 did not have such an adverse effect that would impede practical use.

<Friction Coefficient Ratio and Vibration Frequency (Experimental Example)>

| Frequency | Non-lubricating state | Lubricating state |
| --- | --- | --- |
| Off | 1 | 1 |
| 28 kHz | 0.13 | 0.3 |
| 45 kHz | 0.15 | 0.2 |
| 100 kHz | 0.46 | 0.68 |

Another Embodiment

The present invention is also effective in a strain wave gearing provided with a wave generator of a rolling-contact type. FIG. 2(a) is a schematic longitudinal cross-sectional view of a strain wave gearing having a rolling-contact type wave generator provided with two piezoelectric elements, and FIG. 2(b) is a schematic end view thereof. A strain wave gearing 1A is provided with a rigid internally toothed gear 2A, a flexible externally toothed gear 3A and a rolling-contact type wave generator 4A. The wave generator 4A is provided with a rigid plug 6A (rotating body) having an elliptical outer peripheral surface and a rolling bearing 16 mounted on the outer peripheral surface of the plug. The rolling bearing 16 is a ball bearing, for example. A roller bearing can also be used.

The plug 6A is constituted by a plug body member 7A forming a main portion of the plug excluding plug end portions on both sides in the direction of the major axis L max of an elliptical shape of the plug, and two gear pressing members 8A forming the plug end portions on the both sides in the direction of the major axis L max. In addition, the plug 6A is provided with two piezoelectric elements 9A (excitation units) to generate ultrasonic vibration in the gear pressing members 8A in the direction of the major axis L max. The gear pressing members 8A are attached to the plug body members 7A so that they are slidable only in the direction of the major axis L max.

In this case, in each portion along the major-axis direction of the strain wave gearing 1A, the component parts are in contact with each other, and ultrasonic vibration in the direction of the major axis L max is transmitted to each parts (raceway parts of the rolling bearing of the wave generator, an outer race of the rolling bearing and the inner peripheral surface of the internally toothed gear, tooth surfaces). Therefore, rotational torque of the wave generator 4A can be reduced even in a case of the strain wave gearing 1A provided with the rolling-contact type wave generator 4A in which rollers are made to roll to generate wave motion.

In the strain wave gearings 1 and 1A illustrated in FIGS. 1 and 2, two piezoelectric elements 9 or two piezoelectric elements 9A are used. A single piezoelectric element can be used. For example, a strain wave gearing 1B illustrated in FIG. 3A is provided with a rigid internally toothed gear 2B, a flexible externally toothed gear 3B and a sliding-contact type wave generator 4B. The wave generator 4B is provided with a rigid plug 6B that has a plug body member 7B formed with a mounting recess part 12B continuously passing through the center of the plug body member along the direction of the major axis L max. The mounting recess part 12B has a narrow-width portion in which one piezoelectric element 9B is mounted and wide-width portions on both sides thereof in which gear pressing members 8B are mounted. The gear pressing members 8B are arranged on both sides of the piezoelectric element 8B in a manner sandwiching the same therebetween.

Figure 3B:
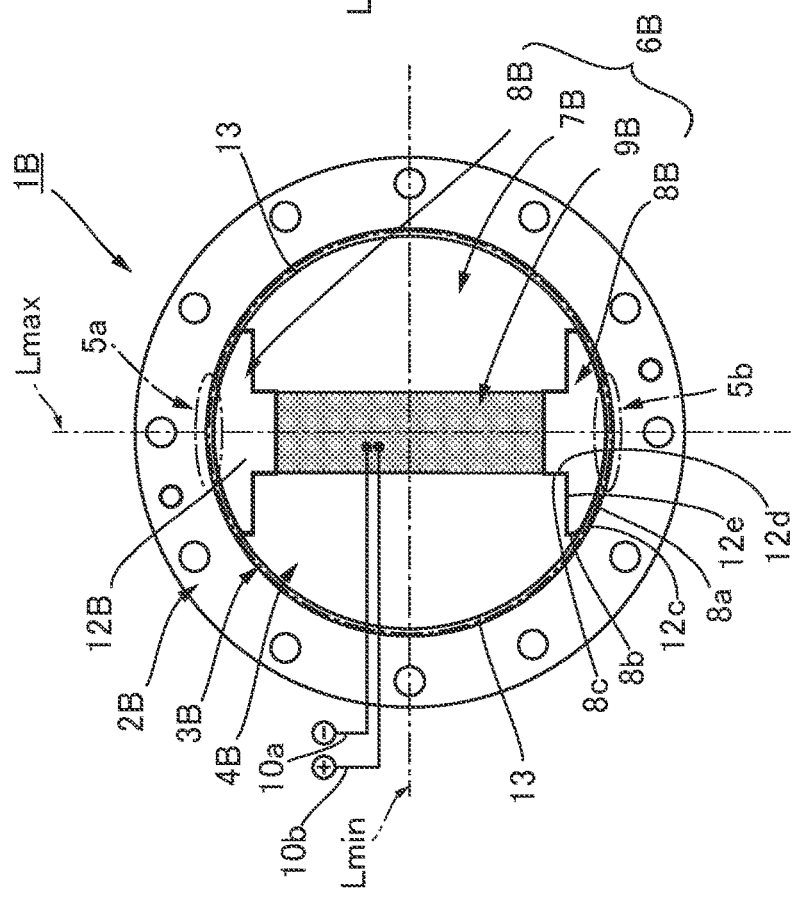
FIG. 3B is a schematic end view of a strain wave gearing which has a rolling-contact type wave generator provided with a single piezoelectric element.

FIG. 3B illustrates a strain wave gearing 1C which has a rigid internally toothed gear 2C, a flexible externally toothed gear 3C and a rolling-contact type wave generator 4C provided with one piezoelectric element. The wave generator 4C is provided with a rigid plug 6C, and a rolling bearing 16C mounted on an elliptical outer peripheral surface of the plug 6C. The plug 6C has a plug body member 7C that is formed with a mounting recess 12C continuously passing through the center thereof along the direction of the major axis L max. A single piezoelectric element 9C is mounted in a narrow-width portion of the mounting recess 12C and gear pressing members 8C are mounted in wide-width portions on both sides of the mounting recess. The gear pressing members 8C are arranged on both sides of the piezoelectric member 9C to sandwich the same therebetween.

Figure 4A:
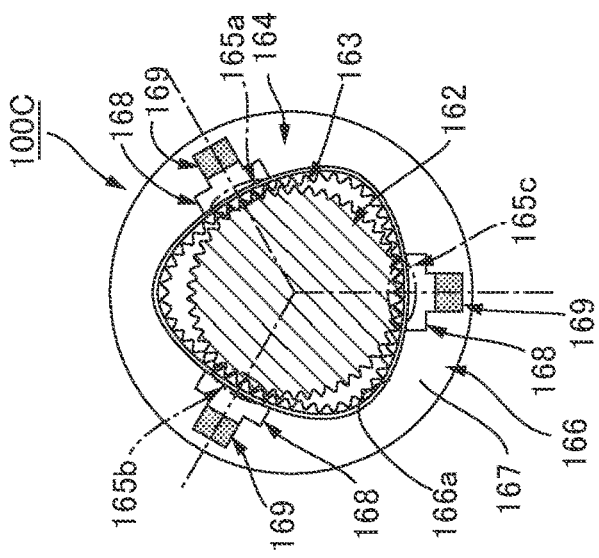
FIG. 4A is an explanatory view illustrating another example of a strain wave gearing provided with a sliding-contact type wave generator.

Next, FIG. 4A is an explanatory view illustrating another embodiment of a strain wave gearing to which the present invention is applied. A strain wave gearing 100A has a rigid externally toothed gear 122 (rigid gear) disposed on the innermost side thereof. An annular flexible internally toothed gear 123 (flexible gear) is disposed to coaxially surround the externally toothed gear 122. An annular wave generator 124 is disposed to coaxially surround the internally toothed gear 123.

The internally toothed gear 123 is flexed by the wave generator 124 into an elliptical shape, for example. The internally toothed gear 123 flexed by the wave generator 124 is formed with meshing portions where the internally toothed gear meshes with the externally toothed gear 122 at two locations on both ends of the minor axis of the elliptical shape. The meshing portions 125a and 125b are those encircled by one-dotted chain lines in FIG. 4A.

The wave generator 124 is provided with an annular rigid cam plate 126 (rotating body). The cam plate 126 has an inner peripheral surface 126a of an elliptical shape. The cam plate 126 is constituted by: cam-plate body member 127; gear pressing members 128 mounted in portions of the cam-plate body member 127, the portions being located on both sides in the direction of the minor axis L min; and piezoelectric elements 129 (excitation units) to apply ultrasonic vibration to the gear pressing members 128 in the direction of the minor axis L min. The rotational torque of the sliding-contact type wave generator 124 can be reduced by applying ultrasonic vibration to the gear pressing members 128.

The present invention may be applied in a case in which the strain wave gearing 100A is provided with a rolling-contact type wave generator. In this case, the wave generator is constituted to have an annular rigid cam plate (rotating body) and a rolling bearing mounted inside the cam plate.

Figure 4B:
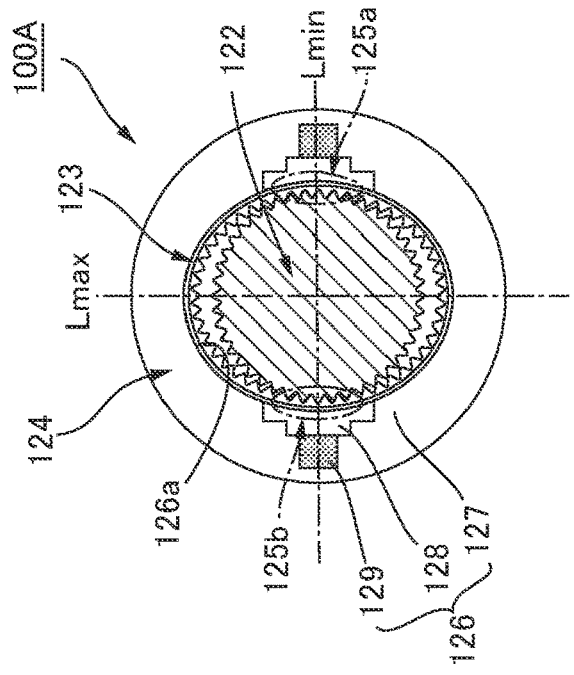
FIG. 4B is an explanatory view illustrating still another example of a strain wave gearing provided with a sliding-contact type wave generator.

Next, the present invention can also be applied to a strain wave gearing in which a flexible gear meshes with a rigid gear at three or more locations. For example, the present invention can be applied to a strain wave gearing in which meshing of teeth between an internally toothed gear and an externally toothed gear are formed at three locations. A strain wave gearing 100B illustrated in FIG. 4B has a rigid internally toothed gear 142 (rigid gear), a flexible externally toothed gear 143 (flexible gear) disposed inside the internally toothed gear, and a non-circular contoured wave generator 144 fitted inside the externally toothed gear. The externally toothed gear 143 has a portion where external teeth are formed, the portion being flexed by the wave generator 144 into a non-circular shape.

The wave generator 144 is provided with a non-circular contoured rigid plug 146. The non-circular outer peripheral surface 146a of the plug 146 is defined by a closed curve which can be inscribed on a true circle at plural locations at equal angular intervals along the circumferential direction of the true circle. The externally toothed gear 143 is flexed by the plug 146 into a non-circular shape, whereby meshing portions 145a, 145b and 145c of the externally toothed gear with the internally toothed gear 142 are formed at three locations at 120-degree angular intervals.

The plug 146 is constituted by: a plug body member 147 forming a plug main portion excluding three plug lobe portions; and three gear pressing members 148 forming the respective plug lobe portions. The wave generator 144 is provided with piezoelectric elements 149 (excitation units) to generate radial ultrasonic vibration in the gear pressing members 148. The rotational torque of the sliding-contact type wave generator 144 can be reduced by applying ultrasonic vibration to the gear pressing members 148.

Figure 4C:
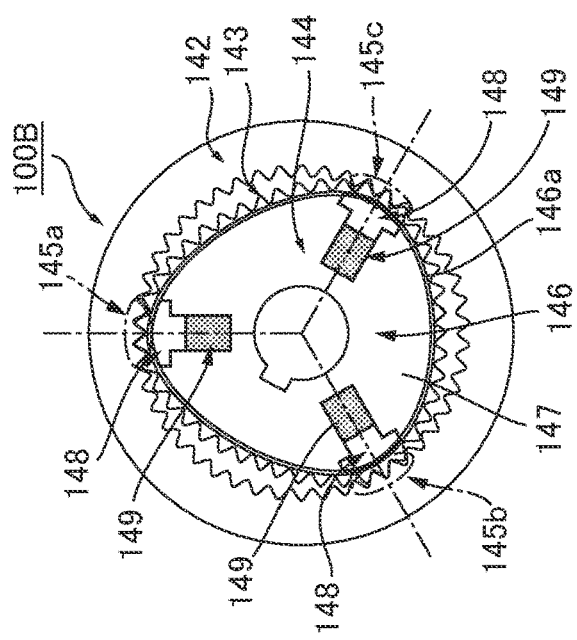
FIG. 4C is an explanatory view illustrating another example of a strain wave gearing provided with a sliding-contact type wave generator.

In addition, the present invention can also be applied to a strain wave gearing as illustrated in FIG. 4C. A strain wave gearing 100C of this figure has a rigid externally toothed gear 162 (rigid gear), a flexible internally toothed gear 163 (flexible gear) disposed outside the rigid externally toothed gear, and a wave generator 164 which has a non-circular contoured inner peripheral surface and is disposed outside the internally toothed gear 163.

The wave generator 164 has a rigid cam plate 166 provided with a non-circular inner peripheral surface 166a. The non-circular inner peripheral surface 166a of the cam plate 166 is defined by a closed curve which can circumscribe a true circle at three locations at equal angular intervals.

With the wave generator 164 of this shape, the internally toothed gear 163 is flexed into a shape along the non-circular contour of the wave generator 164, whereby meshing portions 165a, 165b and 165c of the internally toothed gear with the externally toothed gear 162 are formed at three locations at 120-degree angular intervals. The cam plate 166 is constituted by a cam-plate body member 167 and three gear pressing members 168. In addition, the cam plate 166 is provided with piezoelectric elements 169 (excitation units) to generate ultrasonic vibration in the gear pressing members 168. The rotational torque of the sliding-contact type wave generator 164 can be reduced by applying ultrasonic vibration to the gear pressing members 168.

The present invention can also be applied to a strain wave gearing in which a flexible gear is meshed with a rigid gear at four or more locations. In this case, a non-circular outer peripheral surface or a non-circular inner peripheral surface is defined by a closed curve which can be inscribed or circumscribed on a true circle at four or more locations at equal angular intervals along the circumferential direction.

The invention claimed is:

1. A strain wave gearing comprising:
a rigid gear;
a flexible gear that is disposed coaxially with the rigid gear and is rotatable relative to the rigid gear about a center axis line of the rigid gear; and
a wave generator that is disposed coaxially with the flexible gear and is rotatable relative to the flexible gear about the center axis line,
wherein the wave generator comprises:
a plurality of gear pressing parts that flex the flexible gear in a radial direction at positions at equal angular intervals in a circumferential direction to form a plurality of meshing portions where the flexible gear meshes with the rigid gear; and
an excitation unit that generates ultrasonic vibration of 20 kHz to 80 kHz in the respective gear pressing parts in the radial direction.

2. The strain wave gearing according to claim 1,
wherein the wave generator has a rotating body having the center axis line as a rotation center;
the gear pressing parts are gear pressing members that are attached to positions of the rotating body in a slidable state in the radial direction, the positions being located at equal angular intervals in a circumferential direction of the rotating body;
the excitation unit is one or a plurality of piezoelectric elements attached to the rotating body, the piezoelectric elements being able to displace in one axial direction; and
the piezoelectric elements are linked to the gear pressing members in a state in which a direction of displacement thereof is coincident with the radial direction.

3. The strain wave gearing according to claim 2,
wherein the rigid gear is an internally toothed gear;
the flexible gear is an externally toothed gear disposed inside the internally toothed gear;
the wave generator has a rigid plug as the rotating body, the rigid plug being mounted inside the externally toothed gear and being provided with an outer peripheral surface having an elliptical shape;
the rigid plug has: a plug body member forming a main portion excluding end portions located on both sides of a major-axis direction of the elliptical shape; and two of the gear pressing members forming the end portions on the both sides of the major-axis direction;
the gear pressing members are attached to the plug body member in a slidable state in the major-axis direction; and
the piezoelectric element is attached to the plug body member at a position between the gear pressing members so that the direction of displacement is coincide with the major-axis direction.

4. The strain wave gearing according to claim 3,
wherein the piezoelectric element is applied with a compression force as a preliminary load; and
the preliminary load is a reaction force applied to the piezoelectric element, via the gear pressing members, from the externally toothed gear that is flexed into the elliptical shape.

5. The strain wave gearing according to claim 3,
wherein the gear pressing members have an outer peripheral surface, a circumferential length of the outer peripheral surface being a length extending across an angular range of 30 degrees to 40 degrees left and right from a major axis of the elliptical shape.

6. The strain wave gearing according to claim 3,
wherein the wave generator has a rolling bearing mounted between the outer peripheral surface of the rigid plug and an inner peripheral surface of the externally toothed gear.

* * * * *